US008711229B2

(12) United States Patent
Takada et al.

(10) Patent No.: US 8,711,229 B2
(45) Date of Patent: Apr. 29, 2014

(54) IMAGE PROCESSING UNIT, IMAGE PROCESSING METHOD AND PROGRAM

(75) Inventors: Yohei Takada, Tokyo (JP); Hisamo Sogawa, Kanagawa (JP); Tsuyoshi Kishimoto, Tokyo (JP)

(73) Assignee: Sony Corporation, Tokyo (JP)

(*) Notice: Subject to any disclaimer, the term of this patent is extended or adjusted under 35 U.S.C. 154(b) by 526 days.

(21) Appl. No.: 13/106,174

(22) Filed: May 12, 2011

(65) Prior Publication Data
US 2011/0292235 A1 Dec. 1, 2011

(30) Foreign Application Priority Data

May 31, 2010 (JP) .................................. 2010-123732

(51) Int. Cl.
*H04N 5/228* (2006.01)
*G03B 13/00* (2006.01)
*H04N 5/225* (2006.01)

(52) U.S. Cl.
USPC .................... 348/208.12; 348/345; 348/220.1

(58) Field of Classification Search
None
See application file for complete search history.

(56) References Cited

U.S. PATENT DOCUMENTS

| 2003/0063322 | A1* | 4/2003 | Itoh et al. ....................... 358/302 |
| 2008/0049137 | A1* | 2/2008 | Endo ........................ 348/333.13 |
| 2010/0097454 | A1* | 4/2010 | Kubo et al. ..................... 348/65 |
| 2010/0188532 | A1* | 7/2010 | Kusaka et al. ........... 348/240.99 |

FOREIGN PATENT DOCUMENTS

JP 2004-135029 * 4/2004

* cited by examiner

*Primary Examiner* — Lin Ye
*Assistant Examiner* — Euel Cowan
(74) *Attorney, Agent, or Firm* — Oblon, Spivak, McClelland, Maier & Neustadt, L.L.P.

(57) ABSTRACT

An image processing unit which includes: an input section which inputs a plurality of images each of which is associated with a difference from an in-focus state detected in accordance with differences among images of a subject which is divided during production of each of the plurality of images, the images being produced in continuous shooting in which a series of images are produced continuously in time series; and a selecting section which selects an image with the highest focusing degree in accordance with the difference from the in-focus state from among the plurality of images.

9 Claims, 15 Drawing Sheets

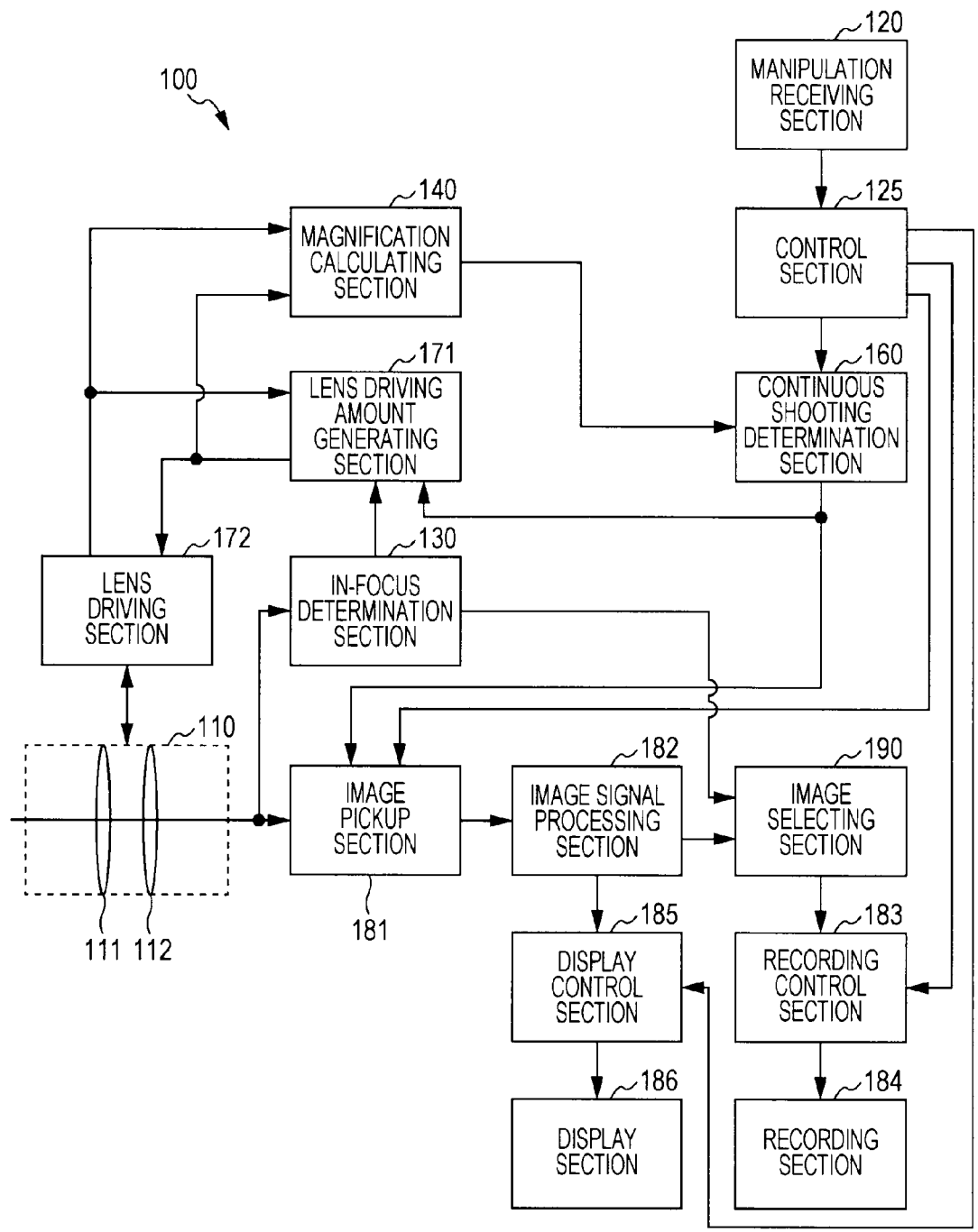

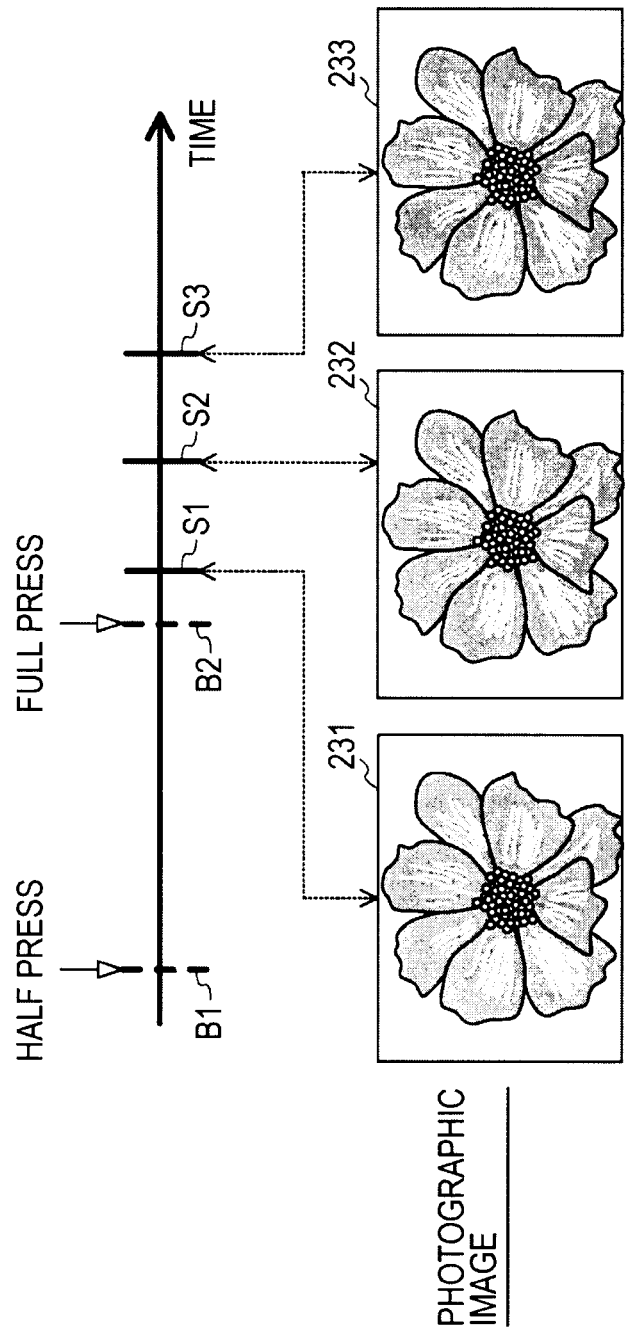

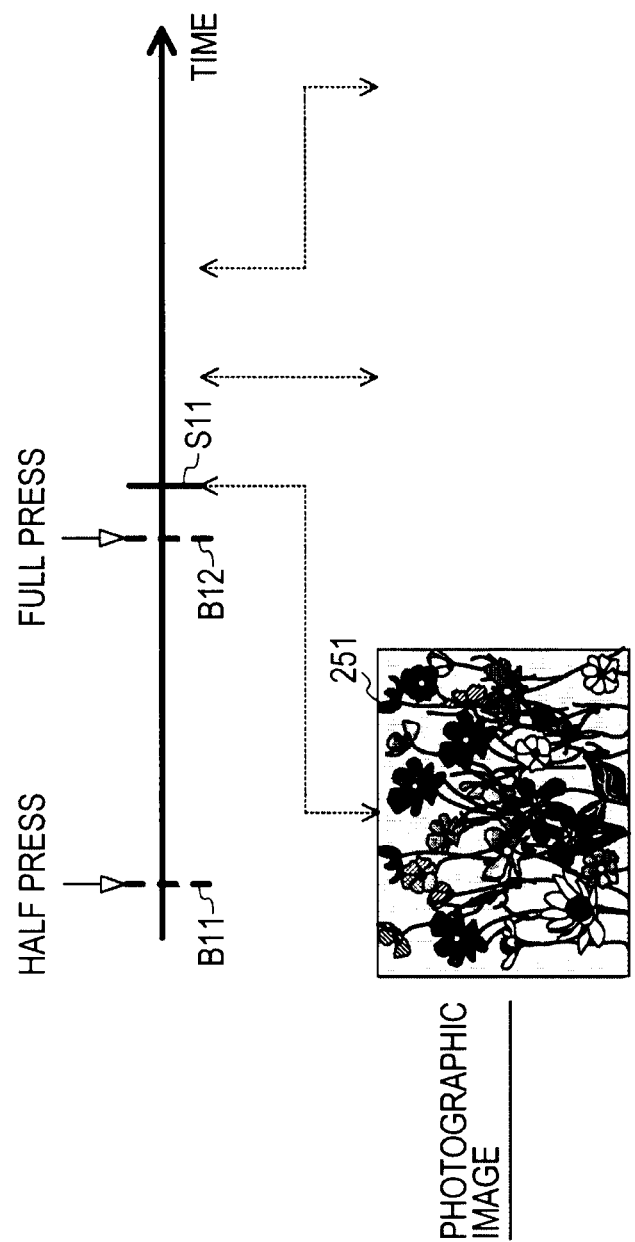

FIG. 5

| IMAGE IDENTIFICATION INFORMATION ~261 | DEFOCUSED AMOUNT ~262 | SELECTED IMAGE IDENTIFICATION INFORMATION ~263 |
|---|---|---|
| #1 | -5 | - |
| #2 | -6 | - |
| #3 | -2 | - |
| #4 | +3 | - |
| #5 | +5 | - |
| #6 | +1 | ○ |

FIG. 6

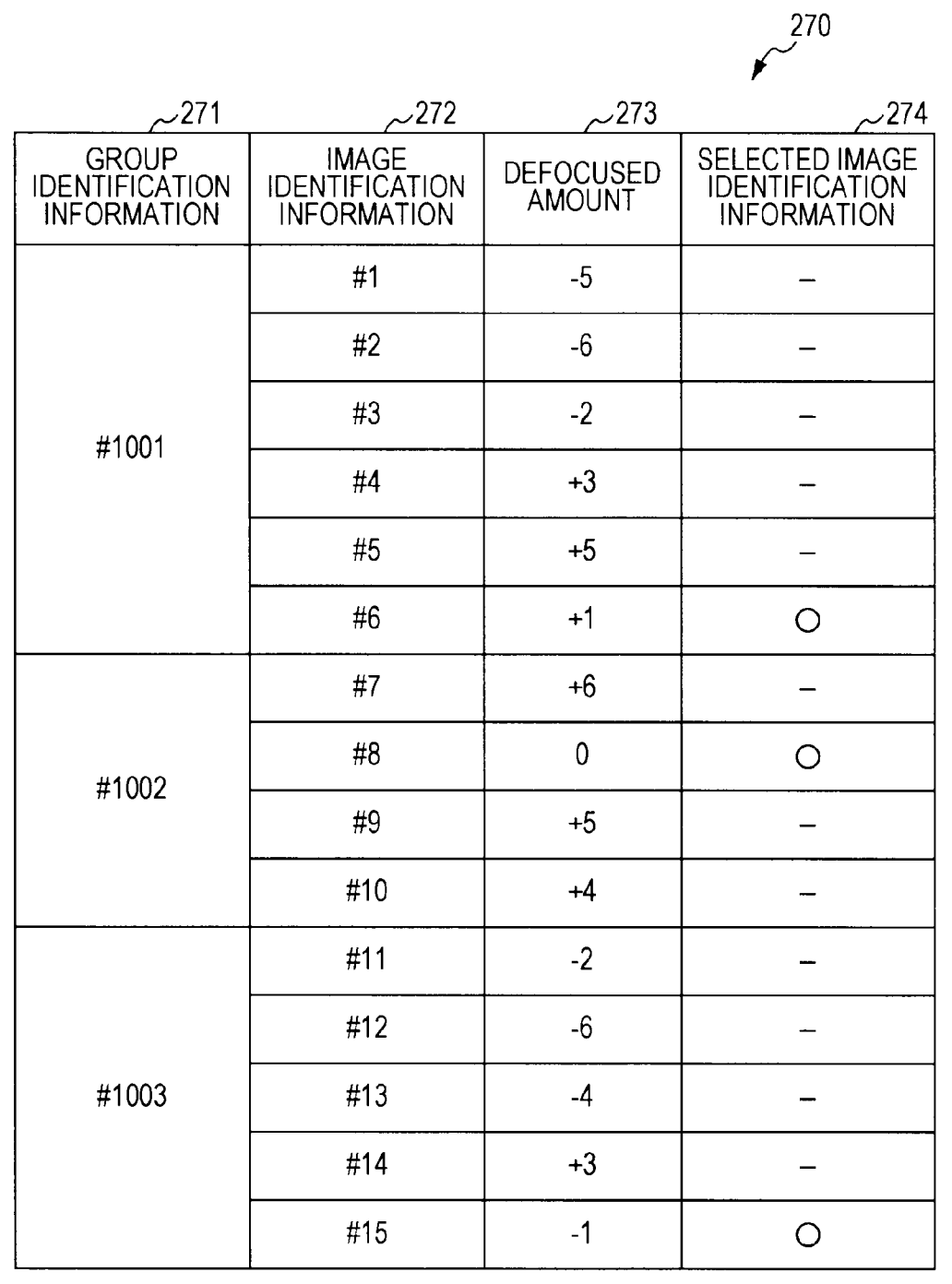

| GROUP IDENTIFICATION INFORMATION (271) | IMAGE IDENTIFICATION INFORMATION (272) | DEFOCUSED AMOUNT (273) | SELECTED IMAGE IDENTIFICATION INFORMATION (274) |
|---|---|---|---|
| #1001 | #1 | -5 | - |
| | #2 | -6 | - |
| | #3 | -2 | - |
| | #4 | +3 | - |
| | #5 | +5 | - |
| | #6 | +1 | ○ |
| #1002 | #7 | +6 | - |
| | #8 | 0 | ○ |
| | #9 | +5 | - |
| | #10 | +4 | - |
| #1003 | #11 | -2 | - |
| | #12 | -6 | - |
| | #13 | -4 | - |
| | #14 | +3 | - |
| | #15 | -1 | ○ |

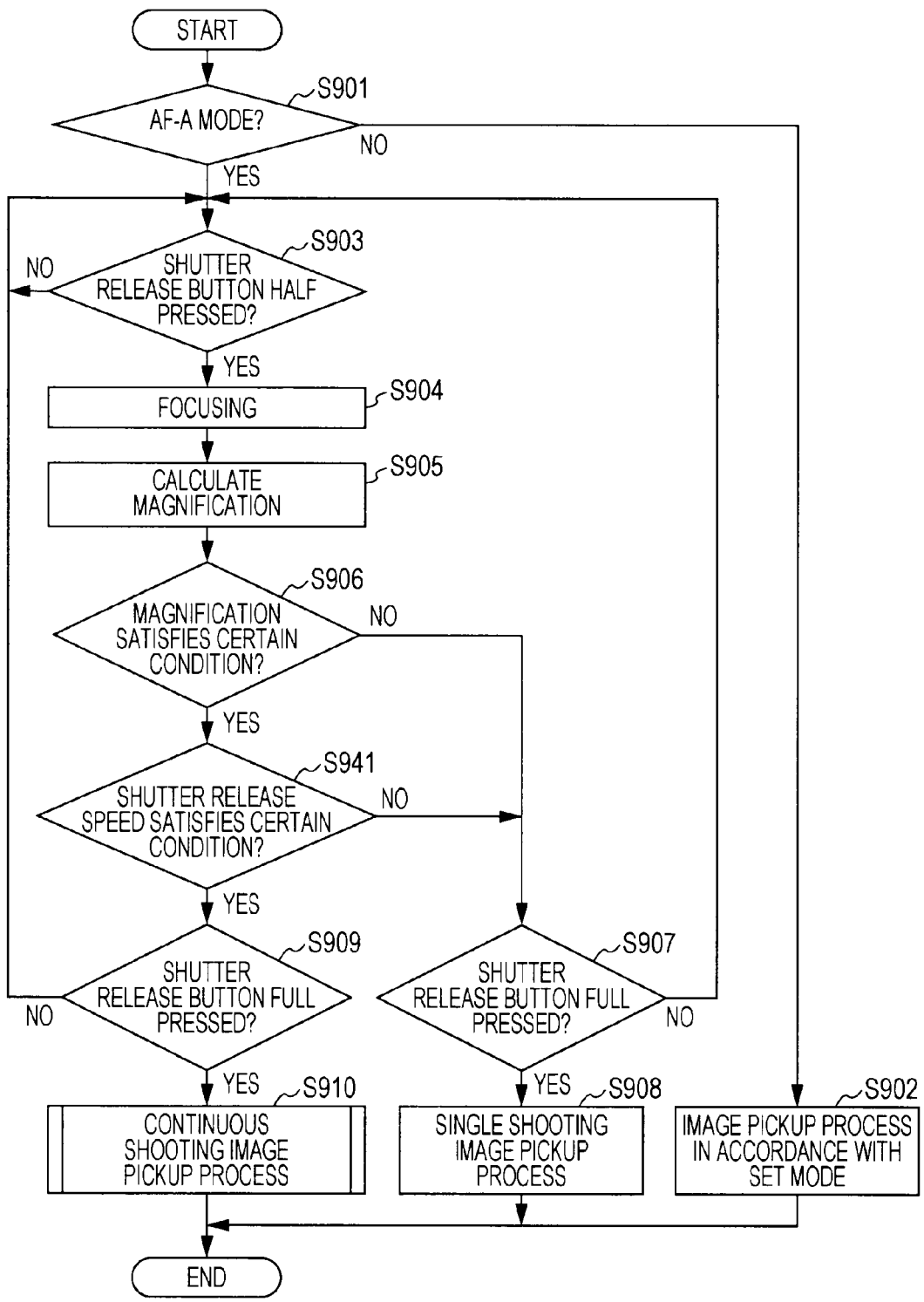

IMAGE PROCESSING UNIT, IMAGE PROCESSING METHOD AND PROGRAM

BACKGROUND OF THE INVENTION

1. Field of the Invention

The present invention relates to an image processing unit and, more particularly, to an image processing unit and an image processing method capable of selecting an image from among a plurality of images produced in continuous shooting, and a program capable of causing a computer to execute the method.

2. Description of the Related Art

Recently, image pickup apparatuses such as digital still cameras for picking up images of subjects such as a figures, producing photographic images thereof and recording the same are widely used. Some of these popular image pickup apparatuses are equipped with a continuously image pickup (i.e., continuous shooting) function.

A plurality of continuously shot photographic images may be recorded; a user can expect that a target photographic image is included therein. However, the user is sometimes bothered by manually selecting the target photographic image from among the plurality of photographic images. In order to address this problem, there has been proposed an image pickup apparatus in which an evaluation area is set for the evaluation of in-focus states of a plurality of focus-bracketed images, and images that are well-focused in the evaluation area are selected and recorded (see, for example, Japanese Unexamined Patent Application Publication No. 2004-135029 (FIG. 3)).

SUMMARY OF THE INVENTION

In such a related art image pickup apparatus, an evaluation area is set in the photographic images for the analysis of focusing degrees depending on the contrast, which allows a selection of well-focused images.

In such an image pickup apparatus, however, it is necessary to compare photographic images with one another in the analysis depending on the contrast. If an object in the evaluation area is moving significantly, images to be compared in the evaluation area differ considerably from one another. It is therefore possible that a target photographic image is not selected properly. For example, the depth of field is small when a target object is zoomed in on (i.e., macro photography). For this reason, when the target object quivers even in a small amount in, for example, the breeze, a subject is also changed significantly. It is therefore possible that, even if well-focused images are included in a plurality of images, difficulty in comparison among other images hinders proper selection of the well-focused images.

It is desirable to properly select well-focused images.

A first embodiment of the present invention is an image processing unit, an image processing method and a program which causes a computer to execute the method, the unit including: an input section which inputs a plurality of images each of which is associated with a difference from an in-focus state detected in accordance with differences among images of a subject which is divided during production of each of the plurality of images, the images being produced in continuous shooting in which a series of images are produced continuously in time series; and a selecting section which selects an image with the highest focusing degree in accordance with the difference from the in-focus state from among the plurality of images. This has an advantageous effect that an image with the highest focusing degree is selected in accordance with a difference from an in-focus state calculated by focus detection through phase difference detection from among a plurality of images produced in continuous shooting.

The first embodiment may further include a difference calculating section which calculates a difference from the in-focus state by focus detection through phase difference detection. This has an advantageous effect that a difference from the in-focus state is calculated by focus detection through phase difference detection.

The first embodiment may further include: an image pickup section which picks up an image of the subject and produces a photographic image; a focus control section which controls focusing by focus detection through phase difference detection; and a control section which, if a plurality of images are produced in continuous shooting, stops the focus control during the period from the start to the end of the shooting of the plurality of images. This has an advantageous effect that the focus is locked during the period from the start to the end of the shooting of the plurality of images produced in continuous shooting.

The first embodiment may further include: an image pickup section which picks up an image of the subject and produces a photographic image; a magnification calculating section which calculates magnification in accordance with a focal length and a subject distance; and a setting section which sets a continuous shooting mode in which the continuous shooting is performed as the shooting mode if the calculated magnification satisfies a certain condition. This has an advantageous effect that the continuous shooting mode is set in which the continuous shooting is performed as the shooting mode if the magnification satisfies a certain condition. In this case, the setting section may set the continuous shooting mode under the certain condition that the calculated magnification is larger than a predetermined magnification. This has an advantageous effect that a continuous shooting mode is set when the magnification is larger than a predetermined magnification. In this case, a determination section which determines whether the image processing unit is fixed may be further included. The setting section may set the continuous shooting mode only when the magnification satisfies the certain condition and it is determined that the image processing unit is fixed. This has an advantageous effect that the continuous shooting mode is set only when the magnification satisfies a certain condition and it is determined that the image processing unit is fixed. In this case, the setting section may set the continuous shooting mode only when the magnification satisfies the certain condition and a shutter release speed during shooting of the plurality of images is higher than a predetermined speed. This has an advantageous effect that the continuous shooting mode is set only when the magnification satisfies a certain condition and a shutter release speed is higher than a predetermined speed.

A second embodiment of the present invention is an image pickup apparatus which includes: an image pickup section which picks up an image of a subject and produces a photographic image; a magnification calculating section which calculates magnification in accordance with a focal length and a subject distance; and a setting section which sets a continuous shooting mode in which a plurality of images are produced in continuous shooting in which a series of images are produced continuously in time series as a shooting mode if the calculated magnification satisfies a certain condition. This has an advantageous effect that the continuous shooting mode in which the continuous shooting is performed is set as a shooting mode if the magnification satisfies a certain condition.

The present invention may produce a significant advantageous effect to enable a proper selection of well-focused images.

BRIEF DESCRIPTION OF THE DRAWINGS

FIG. 1 is a block diagram of an exemplary functional configuration of an image pickup apparatus according to a first embodiment of the present invention;

FIG. 3 is a conceptual diagram of exemplary photographic images in the case that a continuous shooting determination section according to the first embodiment of the present invention determined to pick up the images in continuous shooting;

FIG. 4 is a conceptual diagram of an exemplary photographic image in the case that the continuous shooting determination section according to the first embodiment of the present invention determined to pick up the image in single shooting;

FIG. 5 is a conceptual diagram of exemplary image selection by an image selecting section according to the first embodiment of the present invention;

FIG. 6 is a conceptual diagram of exemplary image management information recorded in a recording section when it is set to record all the photographic images picked up in continuous shooting in the first embodiment of the present invention;

FIG. 15 is a flowchart of an exemplary procedure for an image pickup process by an image pickup apparatus according to the third embodiment of the present invention.

DESCRIPTION OF THE PREFERRED EMBODIMENTS

Figure 2A:
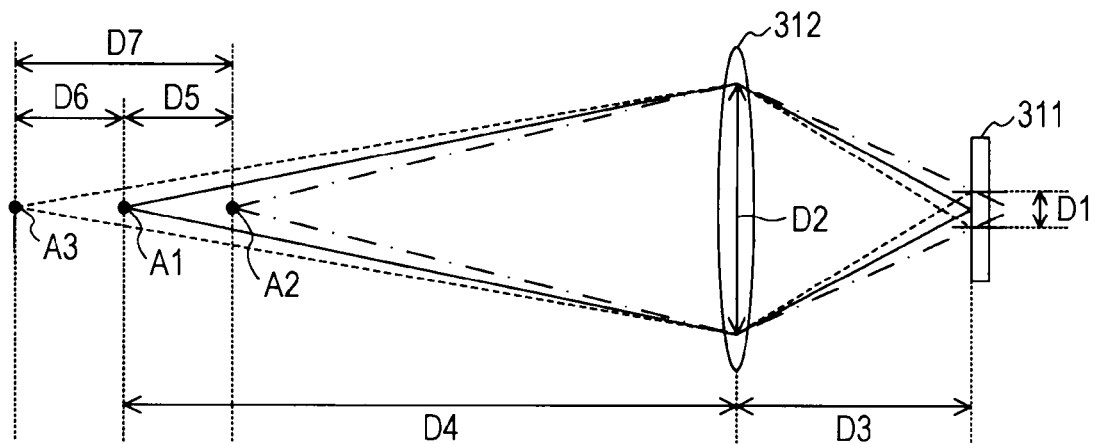
FIGS. 2A and 2B are conceptual diagrams illustrating magnification calculated by a magnification calculating section according to the first embodiment of the present invention.

Hereinafter, forms for implementing the present invention (hereinafter, referred to as "embodiments") will be described. The description will be given in the following order.

1. First Embodiment (Image Pickup Control: Exemplary Image Selection in Accordance with Magnification Information)
2. Second Embodiment (Image Pickup Control: Exemplary Image Selection in Accordance with Magnification Information and Fixation Information)
3. Third Embodiment (Image Pickup Control: Exemplary Image Selection in Accordance with Magnification Information and Shutter Release Speed Information)

1. First Embodiment

Exemplary Functional Configuration of Image Pickup Apparatus

FIG. 1 is a block diagram of an exemplary functional configuration of an image pickup apparatus 100 according to a first embodiment of the present invention.

The image pickup apparatus 100 includes a lens barrel 110, a manipulation receiving section 120, a control section 125, an in-focus determination section 130, a lens driving amount generating section 171, a lens driving section 172, a magnification calculating section 140 and a continuous shooting determination section 160. The image pickup apparatus 100 also includes an image pickup section 181, an image signal processing section 182, an image selecting section 190, a recording control section 183, a recording section 184, a display control section 185 and a display section 186.

In the first embodiment of the present invention, the image pickup apparatus 100 is assumed to be operating in an Autofocus Auto (AF-A) mode (also called an Automatic AF mode). In the AF-A mode, two focusing modes are switched automatically: an AF-S (single) mode (also called a single shot AF mode) in which a focusing position is locked once autofocusing is achieved (i.e., a focusing target becomes in focus); and an AF-C (continuous) mode (also called a continuous AF mode) in which a focusing target is continuously kept in focus (i.e., refocused) following a movement of the focusing target. Herein, putting a subject into focus will be referred to as "focusing."

A lens group, an aperture and other parts for optically controlling light incident to the image pickup section 181 are attached to the lens barrel 110. For the ease of description, only a zoom lens 111 and a focus lens 112 are illustrated in the lens barrel 110.

The zoom lens 111 is moved inside the lens barrel 110 along the optical axis to change the focal length and thus control magnification of the subject in the photographic image.

The focus lens 112 is moved inside the lens barrel 110 along the optical axis to control the focusing.

The manipulation receiving section 120 receives manipulations from a user. The manipulation receiving section 120 supplies, for example, a signal about a half press to the control section 125 as a manipulation signal when a shutter release button is half pressed. The manipulation receiving section 120 supplies, for example, a signal about a full press to the control section 125 as a manipulation signal when the shutter release button is full pressed.

The control section 125 controls operations of each component of the image pickup apparatus 100. In the AF-A mode, when the manipulation signal about the half press of the shutter release button is supplied, the control section 125 supplies information for the determination whether continuous shooting should be performed ("continuous shooting determination start information") to the continuous shooting determination section 160. When the manipulation signal about the full press of the shutter release button is supplied, the control section 125 supplies a signal about the start of image shooting (an "image shooting start signal") to the image pickup section 181 and the recording control section 183. The control section 125 supplies a signal for the control of the display in the display section 186 (a "display control signal") to the display control section 185.

The in-focus determination section 130 determines whether an object to be focused (i.e., a focusing target) is in focus. The in-focus determination section 130 is implemented through phase difference detection. The phase difference detection is a method for detecting an in-focus state, in which a focusing degree is detected in the following manner: light passed through an image pickup lens is pupil-divided to form a pair of images; and a distance between the formed images (i.e., an amount of misalignment between the images) is measured (i.e., a phase difference is detected). When an object in an area in which focusing is to be performed (i.e., a focusing area) is in focus, the in-focus determination section 130 supplies, to the lens driving amount generating section 171, information representing the successful focusing as the in-focus determination result information. When the subject in the focusing area is not in focus, the in-focus determination section 130 calculates a difference from the focused state (a "defocused amount") and sets the information representing the calculated defocused amount as the in-focus determination result information.

When photographic images (i.e., photographic images to be recorded) are produced in continuous shooting in the image pickup section 181, the in-focus determination section 130 calculates the defocused amount during the production of each photographic image. The in-focus determination section 130 supplies the information representing the calculated defocused amount ("image defocusing information") to the image selecting section 190.

The lens driving amount generating section 171 generates a driving amount signal representing a driving amount of the focus lens 112. The lens driving amount generating section 171 generates a driving amount signal for keeping a current position of the focus lens 112 when the subject is in focus. When the subject is not in focus, the lens driving amount generating section 171 calculates a driving amount (i.e., a travel distance) of the focus lens 112 in accordance with the in-focus determination result information representing the defocused amount and position information of the focus lens 112. The lens driving amount generating section 171 then generates a driving amount signal for causing (i.e., controlling) the focus lens 112 by the calculated driving amount.

When the continuous shooting determination information representing the continuous shooting is supplied from the continuous shooting determination section 160 in a period during which the shutter release button is half pressed in the AF-A mode, the lens driving amount generating section 171 generates a driving amount signal for keeping the current position of the focus lens 112. Then, when the shutter release button is full pressed, the lens driving amount generating section 171 keeps the current position of the focus lens 112 until a plurality of images are picked up in continuous shooting. This means that the focus is locked (i.e., no focusing control is made) during the period from the start to the end of the shooting of a plurality of images. The lens driving amount generating section 171 and the in-focus determination section 130 are examples of a difference calculating section, a focus control section and a control section described in the claims.

The lens driving section 172 drives the lens in the lens barrel 110. The lens driving section 172 causes the focus lens 112 to move in accordance with, for example, the driving amount signal supplied from the lens driving amount generating section 171. The lens driving section 172 drives a lens drive motor in accordance with, for example, a proportional integral differential (PID) control system. The lens driving section 172 detects the position of lens in the lens barrel 110 and supplies information representing the detected position ("lens position information") to the lens driving amount generating section 171 and the magnification calculating section 140.

The magnification calculating section 140 calculates magnification. Here, the magnification is the ratio between the size of an image displayed on the image pickup device and the size of the subject. The magnification calculating section 140 calculates, in accordance with a current lens position and the driving amount signal, a subject distance and a focal length after the focus lens 112 is driven in accordance with the driving amount signal. The magnification calculating section 140 calculates the magnification in accordance with the subject distance and the focal length which are calculated. The magnification calculating section 140 supplies information representing the calculated magnification ("magnification information") to the continuous shooting determination section 160. The calculation of the magnification by the magnification calculating section 140 will be described with reference to FIGS. 2A and 2B.

The continuous shooting determination section 160 determines whether a plurality of images are picked up continuously (i.e., in continuous shooting). When the continuous shooting determination start information is supplied from the control section 125, the continuous shooting determination section 160 determines whether the images are to be picked up in continuous shooting depending on whether a predetermined (a certain) condition is satisfied by the magnification specified by the magnification information supplied from the magnification calculating section 140. For example, when the magnification specified by the magnification information is above a predetermined threshold (for example, $1/10$), the continuous shooting determination section 160 determines to use the continuous shooting. When the magnification specified by the magnification information is not above the predetermined threshold (for example, $1/10$), the continuous shooting determination section 160 determines to pick up a single image (in single shooting). That is, in the image pickup apparatus with two shooting modes: the single shooting mode in which an image is picked up as a single shot and the continuous shooting mode in which images are picked up as continuous shots, the continuous shooting determination section 160 uses the continuous shooting mode when the magnification satisfies a predetermined (i.e., a certain) condition. The continuous shooting determination section 160 supplies the continuous shooting determination information representing the determination result to the lens driving amount generating section 171 and the image pickup section 181. The determination in continuous shooting determination section 160 will be described with reference to FIGS. 2A to 4. The continuous shooting determination section 160 is an example of a setting section described in the claims.

The image pickup section 181 photoelectrically converts the light incident from the subject to an electrical signal and generates an image signal. The image pickup section 181 is implemented by including, for example, a complementary metal oxide semiconductor (CMOS) sensor or a charge coupled device (CCD) sensor as an image sensor (i.e., an image pickup device). The image pickup section 181 produces the photographic image(s) in either continuous shooting or single shooting in accordance with the continuous shooting determination information supplied from the continuous shooting determination section 160. The image pickup section 181 starts the shooting of the subject and producing a photographic image in response to the image shooting start signal supplied from the control section 125. For example, when the image shooting start signal is supplied in a situation that the continuous shooting determination information representing the continuous shooting has been supplied from the continuous shooting determination section 160, the image pickup section 181 generates a predetermined number of images in continuous shooting. On the contrary, when the image shooting start signal is supplied in a situation that the continuous shooting determination information representing the single shooting has been supplied, the image pickup section 181 generates an image as a single shot. The image pickup section 181 supplies the produced image (i.e., the photographic image) to the image signal processing section 182 image by image (i.e., frame by frame).

The image signal processing section 182 performs predetermined signal processing to the frame-by-frame image signal supplied from the image pickup section 181 and generates image data to be kept by the recording section 184 and image data to be displayed on the display section 186. The image signal processing section 182 supplies, from among the processed image signals, the image data to be kept by the recording section 184 to the recording control section 183. The image signal processing section 182 supplies, to the display control section 185, the image data to be displayed on the display section 186 from among the processed image signals.

The image selecting section 190 selects a photographic image from among a plurality of (a series of) photographic images picked up in continuous shooting. The image selecting section 190 selects the photographic image with the highest focusing degree in accordance with the image defocusing information corresponding to a series of photographic images supplied from the image pickup section 181 and in accordance with each photographic image supplied from the in-focus determination section 130. The image selecting section 190 then generates selected image identification information for the identification of the selected photographic image, and supplies the generated selected image identification information to the recording control section 183 together with the image data of a series of photographic images and the image defocusing information. The image selecting section 190 is an example of an input section and a selecting section described in the claims.

The recording control section 183 controls recording of the image data in the recording section 184. When it is set to record all the photographic images picked up in continuous shooting, the recording control section 183 generates information for the management of these images ("image management information") in accordance with image data of a series of photographic images, image defocusing information and selected image identification information. The recording control section 183 then records the image data of a series of photographic images and the image management information in the recording section 184. When it is set to record only the photographic image selected by the image selecting section 190 from among the photographic images picked up in continuous shooting, the recording control section 183 identifies the selected photographic image in accordance with the selected image identification information and records the photographic image in the recording section 184.

The recording section 184 records the image data and the image management information supplied from the recording control section 183. For example, the recording section 184 is implemented by a memory card.

The display control section 185 controls a display output to be presented to the user in the display section 186. For example, when a signal for displaying a live view (i.e., a real time image of the subject received by the image pickup device) has been supplied from the control section 125, the display control section 185 produces an image for displaying the live view in the display section 186. When the signal for displaying a screen for setting functions of the image pickup apparatus 100 has been supplied from the control section 125, the display control section 185 produces an image for displaying a function setting screen on the display section 186. The display control section 185 supplies image data about the produced image to the display section 186.

The display section 186 displays images. The display section 186 is implemented by, for example, a color liquid crystal panel. The display section 186 displays, for example, photographic images, recorded images and a mode setting screen.

Exemplary Calculation of Magnification by Magnification Calculating Section

Figure 2B:
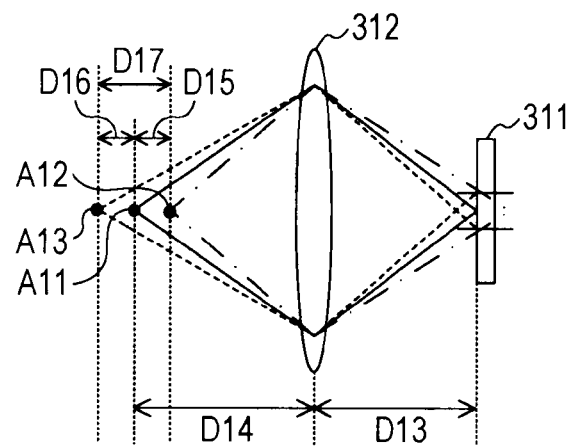

FIGS. 2A and 2B are conceptual diagrams illustrating magnification calculated by the magnification calculating section 140 according to the first embodiment of the present invention.

FIG. 2A illustrates the depth of field with low magnification. FIG. 2A illustrates an image pickup device 311 which constitutes the image pickup section 181, and a lens 312 which schematically represents a lens group in the lens barrel 110. A diameter of a permissible circle of confusion in a pixel circuit in the image pickup device 311 (a permissible circle of confusion D1), an effective aperture of the lens 312 (an effective aperture D2), a focal length (a focal length D3) and a subject distance (a subject distance D4) are illustrated in FIG. 2A. A front depth of field (a front depth of field D5), a rear depth of field (a rear depth of field D6), a depth of field (a depth of field D7) and three subjects (subjects A1, A2 and A3) are illustrated in FIG. 2A.

The subject A1 is a target object which should be in focus on an image pickup surface in the image pickup device 311.

The subject A2 is a target object located in front of the subject A1 (i.e., located at a position further toward the lens). Since the subject A2 is focused behind the image pickup surface (i.e., a position away from the lens), the image thereof on the image pickup surface becomes a circle of confusion; however, the subject A2 looks like being in focus because the circle of confusion of the image thereof on the image pickup surface has the same diameter as that of the permissible circle of confusion (the permissible circle of confusion D1). The front depth of field D5 is the distance between the subject A2 and the subject A1.

The subject A3 is a target object located behind the subject A1 with respect to the lens (i.e., located at a position away from the lens). Since the subject A3 is focused in front of the image pickup surface (i.e., a position near the lens), the image thereof on the image pickup surface becomes a circle of confusion; however, the subject A3 looks like being in focus because the circle of confusion of the image thereof on the image pickup surface has the same diameter as that of the permissible circle of confusion (the permissible circle of confusion D1). The rear depth of field D6 is the distance between the subject A3 and the subject A1.

FIG. 2B illustrates the depth of field with high magnification. Here, the high magnification is assumed to be achieved using the image pickup device 311 and the lens 312 illustrated in FIG. 2A. That is, the diameter of the permissible circle of confusion in the image pickup device 311 and the effective aperture of the lens 312 are the same as those illustrated in FIG. 2A. The focal length (a focal length D13), the subject distance (a subject distance D14) and the front depth of field (a front depth of field D15) are illustrated in FIG. 2B. A rear depth of field (a rear depth of field D16), a depth of field (a depth of field D17) and three subjects (subjects A11, A12 and A13) are illustrated in FIG. 2B. Since the illustration in FIG. 2B corresponds to that of FIG. 2A, differences from FIG. 2A will be described below.

The subject distance (the subject distance D14) illustrated in FIG. 2B is shorter than the subject distance (the subject distance D4) illustrated in FIG. 2A. The front depth of field (the front depth of field D15), the rear depth of field (the rear depth of field D16) and the depth of field (the depth of field D17) illustrated in FIG. 2B are smaller than those illustrated in FIG. 2A. Thus, as FIGS. 2A and 2B show, the higher the magnification, the smaller the depth of field becomes.

Next, the depth of field will be explained. The depth of field T can be obtained by adding a front depth of field $T_f$ and a rear depth of field $T_r$. The front depth of field $T_f$ may be obtained by the following Equation 1. The rear depth of field $T_r$ may be obtained by the following Equation 2.

$$T_f = \delta F L^2 / (f^2 + \delta F L) \qquad \text{(Equation 1)}$$

$$T_r = \delta F L^2 / (f^2 - \delta F L) \qquad \text{(Equation 2)}$$

Here, δ is the diameter of the permissible circle of confusion. The permissible circle of confusion δ is represented as the permissible circle of confusion D1 in FIG. 2A. f represents the focal length. The focal length f is represented as the focal lengths D3 and D13 in FIGS. 2A and 2B.

F is an f number of the lens. The f number F of the lens may be obtained by dividing the focal length f by the effective aperture (the effective aperture D) of the lens (F=f/D). The effective aperture D is represented as the effective aperture D2 in FIG. 2A. L is the subject distance. The subject distance L is represented as the subject distances D4 and D14 in FIGS. 2A and 2B.

Thus, as Equations 1 and 2 show, the shorter the subject distance L (i.e., as the lens approaches the subject), the smaller the depth of field T becomes (i.e., the numerator becomes small); and the longer the focal length f (i.e., the subject is zoomed in), the smaller the depth of field T becomes (the denominator becomes large). This means that the depth of field T becomes smaller as a user tries to pick up a closer object at high magnification (i.e., zoomed in) (for example, in macro photography).

Next, magnification calculated by the magnification calculating section 140 will be explained. The magnification M may be obtained by the following Equation 3.

$$M = f/L \qquad \text{(Equation 3)}$$

The magnification calculating section 140 first calculates the subject distance (the subject distance L) and the focal length (the focal length f) in accordance with the current position of the focus lens 112 and with the driving amount of focus lens 112. The magnification calculating section 140 then calculates the magnification M using Equation 3.

As Equation 3 shows, the shorter the subject distance L, the larger the magnification M becomes; and the longer the focal length f, the larger the magnification M becomes. Thus, as Equations 1 and 2 show, the larger the magnification M, the smaller the depth of field becomes.

As FIGS. 2A and 2B show, the larger the magnification, the smaller the depth of field becomes. That is, since the larger magnification involves in the smaller depth of field, it is difficult to focus on a focusing target which is in motion. The continuous shooting determination section 160 detects this state of difficulty in focusing from the magnification and, when such a state is detected, determines to use continuous shooting.

Exemplary Image Pickup by Continuous Shooting

FIG. 3 is a conceptual diagram of exemplary photographic images in the case that the continuous shooting determination section 160 according to the first embodiment of the present invention determined to pick up the images in continuous shooting.

Here, for the ease of description, the number of photographic images in continuous shooting is assumed to be three.

FIG. 3 schematically illustrates image pickup timing in continuous shooting and photographic images picked up at the timing.

FIG. 3 illustrates, on the temporal axis, timing at which the shutter release button is half pressed (half press timing B1), timing at which the shutter release button is full pressed (full press timing B2), and pickup timing of the full press timing (shutter timing S1, S2 and S3). Picked-up images (photographic images 231, 232 and 233) are also illustrated in FIG. 3.

Here, determination about continuous shooting by the continuous shooting determination section 160 will be described. When the manipulation receiving section 120 receives half press of the shutter release button (at half press timing B1), the in-focus determination section 130 makes in-focus determination for the focusing target in the focusing area and calculates a defocused amount. In accordance with the focusing-determination result information representing the calculated defocused amount, the lens driving amount generating section 171 and the lens driving section 172 move the focus lens 112 to achieve an in-focus state. Then, in-focus determination is made again in accordance with the position of the moved focus lens 112. Thus, occurrence of defocusing is checked regularly.

Here, the magnification calculating section 140 calculates the subject distance (the subject distance L) and the focal length (the focal length f) in accordance with the current lens position and the driving amount of the focus lens 112. The magnification calculating section 140 then calculates magnification using Equation 3 and supplies the magnification information representing the calculated magnification to the continuous shooting determination section 160.

The continuous shooting determination section 160 compares the magnification with a threshold and, when it is analyzed that the magnification is above the threshold, supplies the continuous shooting determination information representing continuous shooting to the lens driving amount generating section 171 and the image pickup section 181. In this manner, determination about continuous shooting is completed in a period during which the shutter release button is half pressed (i.e., a period between the half press timing B1 and the full press timing B2).

When the shutter release button is full pressed (at the full press timing B2), the focus is locked at the in-focus position at the full press timing and a predetermined number of images are produced in continuous shooting. During the production of the images, the in-focus determination section 130 obtains the defocused amount and supplies the obtained defocused amount to the image selecting section 190 as image defocusing information. That is, as illustrated in FIG. 3, when the shutter release button is full pressed at the full press timing B2, the defocused amount of each of the three images (i.e., the photographic images 231, 232 and 233) is generated during the image pickup with the locked focus. The image selecting section 190 then selects a single image from among the plurality of produced images.

As described above, in the mode in which determination about the continuous shooting is made (i.e., the AF-A mode), the image pickup apparatus 100 produces a plurality of photographic images in continuous shooting with the locked focus when the magnification is above the threshold.

Exemplary Image Pickup in Single Shooting

FIG. 4 is a conceptual diagram of an exemplary photographic image in the case that the continuous shooting determination section 160 according to the first embodiment of the present invention determined to pick up the image in single shooting.

For the purpose of comparison with FIG. 3, FIG. 4 schematically illustrates image pickup timing in single shooting and a photographic image.

FIG. 4 illustrates, on the temporal axis, timing at which the shutter release button is half pressed (half press timing B11), timing at which the shutter release button is full pressed (full press timing B12), and pickup timing of the full press timing (shutter timing S11). FIG. 4 also illustrates an image (a photographic image 251) picked up at the shutter timing S11.

The determination about single shooting by the continuous shooting determination section 160 will be briefly explained in comparison with the determination about continuous shooting described with reference to FIG. 3. In the period between the half press timing B11 and the full press timing B12, the continuous shooting determination section 160 compares the magnification with the threshold and, when it is analyzed that the magnification is below the threshold, supplies the continuous shooting determination information representing the single shooting to the lens driving amount generating section 171 and the image pickup section 181. In this manner, determination about single shooting is completed in a period during which the shutter release button is half pressed (i.e., a period between the half press timing B11 and the full press timing B12).

When the shutter release button is full pressed (at the full press timing B12), a single image (i.e., the photographic image 251) is produced in single shooting.

As described above, in the mode in which determination about the continuous shooting is made (i.e., the AF-A mode), the image pickup apparatus 100 produces a single photographic image in single shooting when the magnification is not above the threshold.

Exemplary Image Selection by Image Selecting Section

FIG. 5 is a conceptual diagram of exemplary image selection by the image selecting section 190 according to the first embodiment of the present invention.

Here, it is assumed that six photographic images are produced during a session of continuous shooting.

FIG. 5 illustrates a table which schematically describes a method for selecting an image by the image selecting section 190. The table includes image identification information 261 for the identification of six photographic images to be subject to the image selection and a defocused amount 262 representing a difference from the in-focus state during the pickup of each photographic image. The table also includes selected image identification information 263 for the identification of a photographic image selected by the image selecting section 190.

Here, the selection of the photographic image by the image selecting section 190 will be described with reference to FIG. 5.

When the continuous shooting is performed, a plurality of photographic images produced by the image pickup section 181 are supplied to the image selecting section 190 via the image signal processing section 182. The defocused amount during the production of each of the photographic images is supplied to the image selecting section 190 together with the photographic images. The image selecting section 190 selects an image with the highest focusing degree from among the plurality of images in accordance with the defocused amount. A photographic image with the smallest defocused amount (i.e., a photographic image represented by #6 of the image identification information) is then selected and selected image identification information representing that this image has been selected is generated.

The image selecting section 190 supplies the generated selected image identification information to the recording control section 183 together with image data of a series of photographic images and the defocused amount.

When it is set to record only the selected photographic image, the recording control section 183 identifies the selected photographic image in accordance with the selected image identification information and records the identified photographic image in the recording section 184. On the contrary, when it is set to record all the photographic images picked up in continuous shooting, the recording control section 183 generates image management information and records image data of a series of photographic images and the image management information in the recording section 184.

Exemplary Image Management Information Recorded in Recording Section

FIG. 6 is a conceptual diagram of exemplary image management information recorded in the recording section 184 when it is set to record all the photographic images picked up in continuous shooting in the first embodiment of the present invention.

For the ease of description, it is assumed herein that the recording control section 183 has produced a different number of photographic images in each session of continuous shooting. Here, the recording control section 183 has produced six photographic images in the first session, four photographic images in the second session and five photographic images in the third session.

FIG. 6 schematically illustrates image management information 270 for the management of image data of the photographic images generated in continuous shooting. The image management information 270 includes group identification information 271 for the classification of the image data for each session of continuous shooting and image identification information 272 for the identification of the image recorded in the recording section 184. The image management information 270 also includes a defocused amount 273 of the image data and selected image information 274 representing an image with the highest focusing degree for each session of continuous shooting.

The group identification information 271 is identification information for the identification of a series of photographic images picked up in continuous shooting as a group.

The image identification information 272 is identification information for the identification of the photographic images.

The defocused amount 273 is identification information for the identification of the focusing degree to the focusing target in the photographic images picked up in continuous shooting. For example, the defocused amount is a value which represents the defocused amount as a positive or negative value with the defocused amount representing the in-focus state being "0." The defocused amount is used for the recognition of the difference from the in-focus state when, for example, a user sorts out the photographic images.

The selected image information 274 is identification information for the identification of a photographic image with the highest focusing degree to the focusing target from among a plurality of photographic images belonging to the same group. For example, the selected image information 274 is a binary value "1" which represents the selected image (which is represented by circles in FIG. 6) and is "0" which represents the other images (which is represented by "-" in FIG. 6).

Since the image management information 270 is kept in the recording section 184 together with the image data, the images selected in accordance with the defocused amount can be easily identified in the case that it is set to record all the photographic images picked up in continuous shooting.

Figure 7:
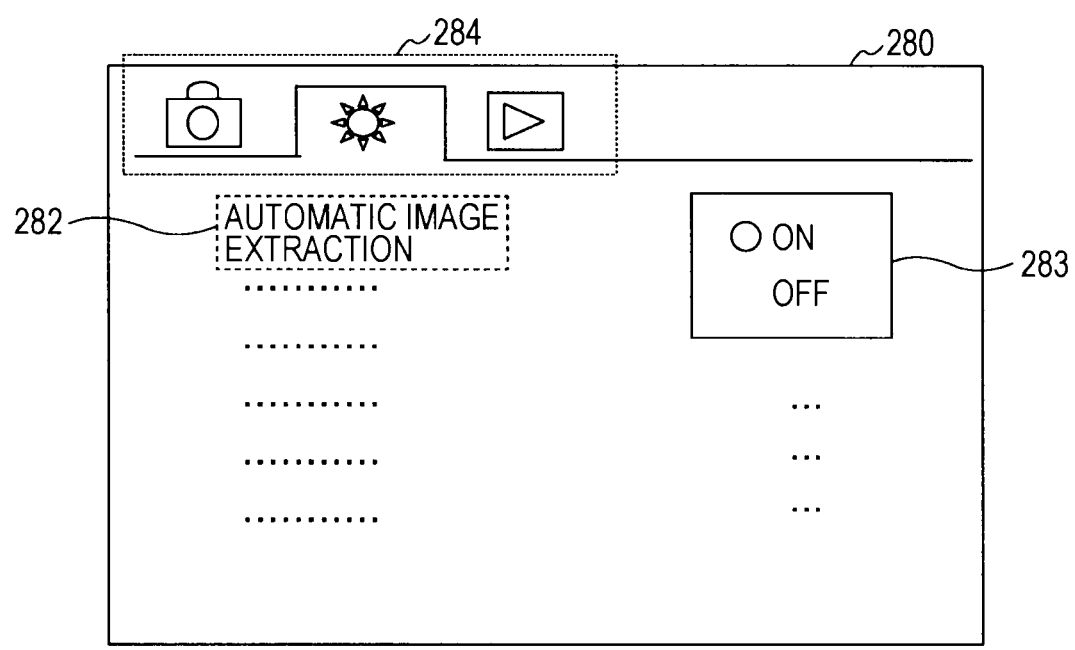
FIG. 7 is a conceptual diagram of an exemplary setting screen, for setting how to save photographic images picked up in continuous shooting, displayed on a display section according to the first embodiment of the present invention.

Exemplary Setting Screen for Setting Saving Method of Photographic Image in Continuous Shooting FIG. 7 is a conceptual diagram of an exemplary setting screen, for setting how to save photographic images picked up in continuous shooting, displayed on a display section 186 according to the first embodiment of the present invention.

FIG. 7 will be described in which a function to select a photographic image with the highest focusing degree from among the photographic images picked up in continuous shooting and record only the selected photographic image in the recording section 184 is called an "automatic image extraction" function.

A display screen (a setting screen 280) for setting the saving method of the photographic images picked up in continuous shooting is illustrated in FIG. 7. The setting screen 280 includes an area in which a tab for providing the user with a visual display of categories of functions set in the current display (i.e., a tab display area 284) is displayed. The setting screen 280 also includes an area in which a function set in the current setting screen (i.e., automatic image extraction) is displayed (i.e., a function display area 282). The setting screen 280 also includes an area in which setup details of the function set in the current setting screen (i.e., on and off of the automatic image extraction) are displayed (i.e., a setup detail display area 283).

When the setting screen 280 is displayed on the display section 186, the user can set on and off of the function (i.e., the automatic image extraction) displayed in the function display area 282. In particular, by entering with a selector (i.e., a circle) displayed in the setup detail display area 283 being "ON," the user can make a setup to select only a single image from among a plurality of photographic images picked up in continuous shooting and record only the selected image in the recording section 184 when continuous shooting is performed. In addition, by entering with the selector (i.e., the circle) being "OFF," the user can make a setup to record all the plurality of photographic images picked up in continuous shooting in the recording section 184 together with the image management information when continuous shooting is performed.

Exemplary Operation of Image Pickup Device

Next, an operation of the image pickup apparatus 100 according to the first embodiment of the present invention will be described with reference to the drawings.

Figure 8:
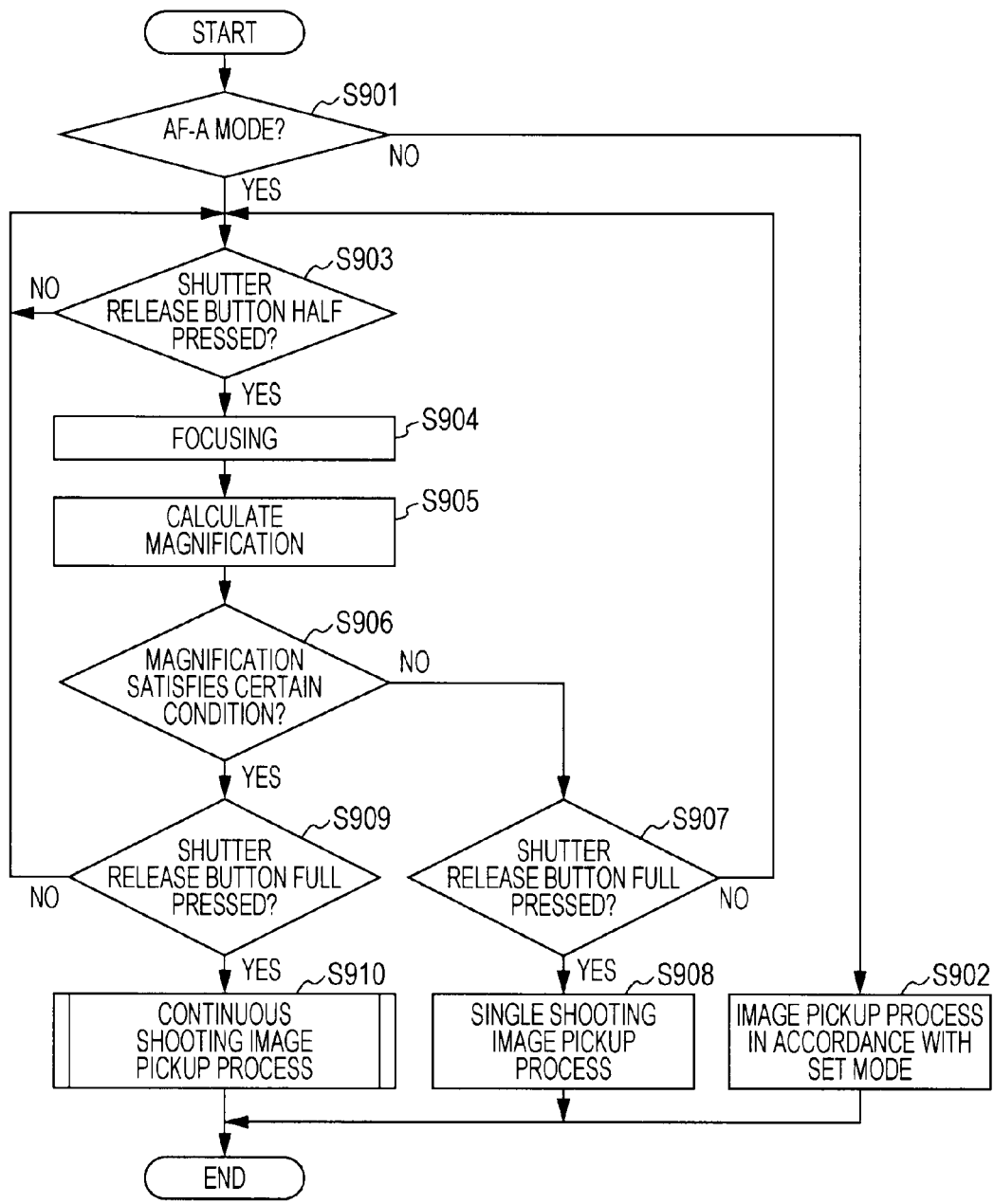
FIG. 8 is a flowchart of an exemplary procedure for an image pickup process by the image pickup apparatus according to the first embodiment of the present invention.

FIG. 8 is a flowchart of an exemplary procedure for an image pickup process by the image pickup apparatus 100 according to the first embodiment of the present invention.

First, the control section 125 determines whether the shooting mode is the AF-A mode (step S901). If it is determined that the shooting mode is not the AF-A mode (step S901), an image of the subject is picked up in the image pickup process in accordance with the currently set shooting mode (step S902) and the image pickup process is completed.

If, on the contrary, it is determined that the shooting mode is the AF-A mode (step S901), the control section 125 determines whether the shutter release button is half pressed (step S903). If it is determined that the shutter release button is not half pressed (step S903), the process returns to step S903 and stands by until the shutter release button is half pressed.

If, on the contrary, it is determined that the shutter release button is half pressed (step S903), focusing is performed (i.e., the focusing target is focused) by the in-focus determination section 130, the lens driving amount generating section 171 and the lens driving section 172 (step S904). Then magnification is calculated by the magnification calculating section 140 in accordance with the lens position and the driving amount of the lens during the focusing (step S905). Subsequently, the continuous shooting determination section 160 determines, in accordance with the calculated magnification, whether the images are picked up in continuous shooting depending on whether a certain condition is satisfied by the magnification (i.e., whether the magnification is above a threshold) (step S906).

If it is determined that the magnification is not above the threshold and that the image is picked up in single shooting (step S906), the control section 125 determines whether the shutter release button is full pressed (step S907). If it is determined that the shutter release button is not full pressed (i.e., the user's finger is removed from the shutter release button) (step S907), the process returns to step S903.

If, on the contrary, it is determined that the shutter release button is full pressed (step S907), a single shooting image pickup process is performed to pick up only a single image (step S908) and the image pickup process is completed.

If it is determined that the magnification is above the threshold and that the images are picked up in continuous shooting (step S906), the control section 125 determines whether the shutter release button is full pressed (step S909). If it is determined that the shutter release button is not full pressed (i.e., the user's finger is removed from the shutter release button) (step S909), the process returns to step S903.

If, on the contrary, it is determined that the shutter release button is full pressed (step S909), a continuous shooting process is performed to pick up a predetermined number of images (step S910). Then the image pickup process is completed. The continuous shooting process (step S910) will be described with reference to FIG. 9.

Figure 9:
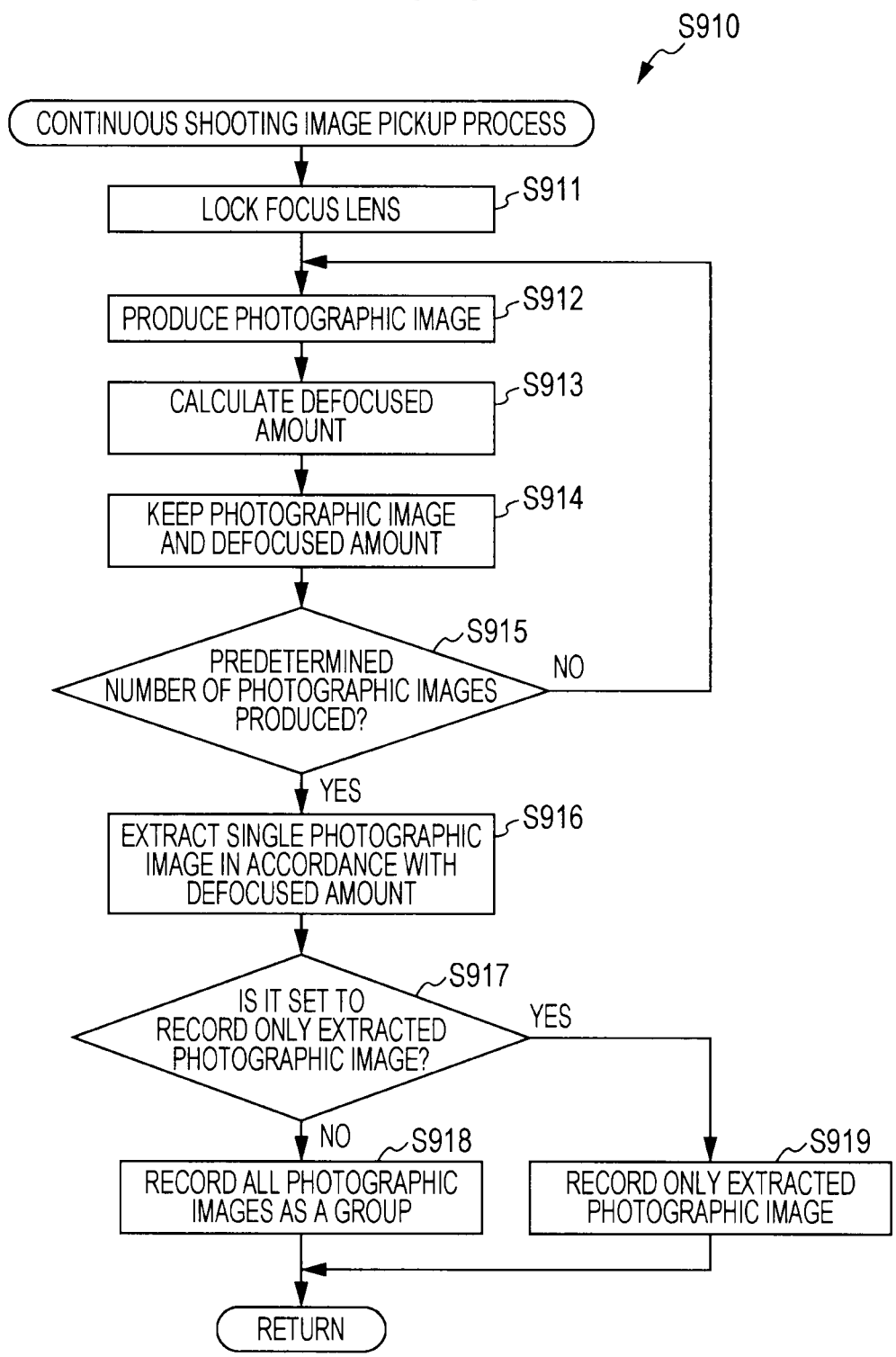
FIG. 9 is a flowchart of an exemplary continuous shooting process according to the first embodiment of the present invention.

FIG. 9 is a flowchart of an exemplary procedure for a continuous shooting process (step S910) according to the first embodiment of the present invention.

First, the position of the focus lens 112 is locked at the in-focus position at the timing at which the shutter release button is full pressed (step S911). Then the image pickup section 181 picks up an image of the subject and produces a photographic image thereof (step S912). A defocused amount regarding the photographic image is calculated by the in-focus determination section 130 (step S913). The produced photographic image and the calculated defocused amount are kept temporarily (step S914).

Subsequently, the image pickup section 181 determines whether a predetermined number of photographic images have been produced in continuous shooting (step S915). If it is determined that a predetermined number of photographic images have not been produced (step S915), the process returns to step S912.

If, on the contrary, it is determined that a predetermined number of photographic images have been produced (step S915), a single photographic image is selected from among the predetermined number of photographic images by the image selecting section 190 in accordance with the defocused amount (step S916). Then the recording control section 183 determines whether it is set to record a single photographic image (step S917). If it is determined that it is not set to record a single photographic image (step S917), all the photographic images are recorded in the recording section 184 as a group (step S918). Step S916 is an exemplary input procedure and a selection procedure described in the claims.

If, on the contrary, it is determined that it is set to record a single photographic image (step S917), a single image selected by the image selecting section 190 is recorded in the recording section 184 (step S919).

As described above, according to the first embodiment of the present invention, whether or not the images of the subject are to be picked up in continuous shooting can be determined automatically depending on the magnification. If a plurality of photographic images are produced in continuous shooting in accordance with the determination, an image with the best in-focus state can be selected in accordance with the defocused amount detected for each of a plurality of photographic images through the phase difference detection.

The image pickup apparatus 100 according to the first embodiment of the present invention can be effectively used in, for example, a situation described below. When doing macro photography (with high magnification) of, for example, a flower outdoors, a user often zooms in or widens an aperture to reduce the depth of field for the purpose of obtaining an image with exaggerated perspective. However, if the flower quivers in the breeze, the flower is significantly defocused due to the reduced depth of field. If the image pickup apparatus tries to autofocus the defocused subject, focusing is made on the flower which is in motion; it is therefore difficult to pick up an image with a target position in focus.

In such a situation, the image pickup apparatus 100 automatically picks up images in continuous shooting with a fixed focus position in accordance with the magnification. This increases the possibility that the user obtains a target photographic image. The image pickup apparatus 100 selects a photographic image with the highest focusing degree in accordance with the defocused amount of the photographic image detected through phase difference detection. This allows an automatic selection (extraction) of the photographic image targeted by the user.

In the first embodiment of the present invention, the image pickup apparatus 100 has been described with reference to the example in which the continuous shooting is performed in accordance with the magnification in the AF-A mode; but the present invention is not limited to the same. Any shooting mode can be used as long as a focusing position can be determined by autofocusing.

In the image pickup apparatus 100, use of the continuous shooting is determined depending only on the magnification; but the present invention is not limited to the same. For example, a tendency of occurrence of the difference from the in-focus state can be determined even in more detail when the status of the aperture (the f number) is included in the condition of the continuous shooting determination in addition to the magnification. If the image pickup apparatus has a macro mode for close-up photography (i.e., macro photography), the continuous shooting mode may be set under the condition that the shooting mode is set to the macro mode.

2. Second Embodiment

In the first embodiment of the present invention, an example in which whether images of a subject will be picked up in continuous shooting is determined automatically in accordance with the magnification has been described. In the described example, the continuous shooting is automatically performed whenever the magnification is high; the user may sometimes move the camera in surprise that the continuous shooting suddenly started.

In a second embodiment of the present invention, an exemplary image pickup apparatus in which whether the continuous shooting is used is determined through detection of a fixed state of the image pickup apparatus in addition to detection of magnification will be described with reference to FIGS. 10 to 13.

Exemplary Functional Configuration of Image Pickup Apparatus

Figure 10:
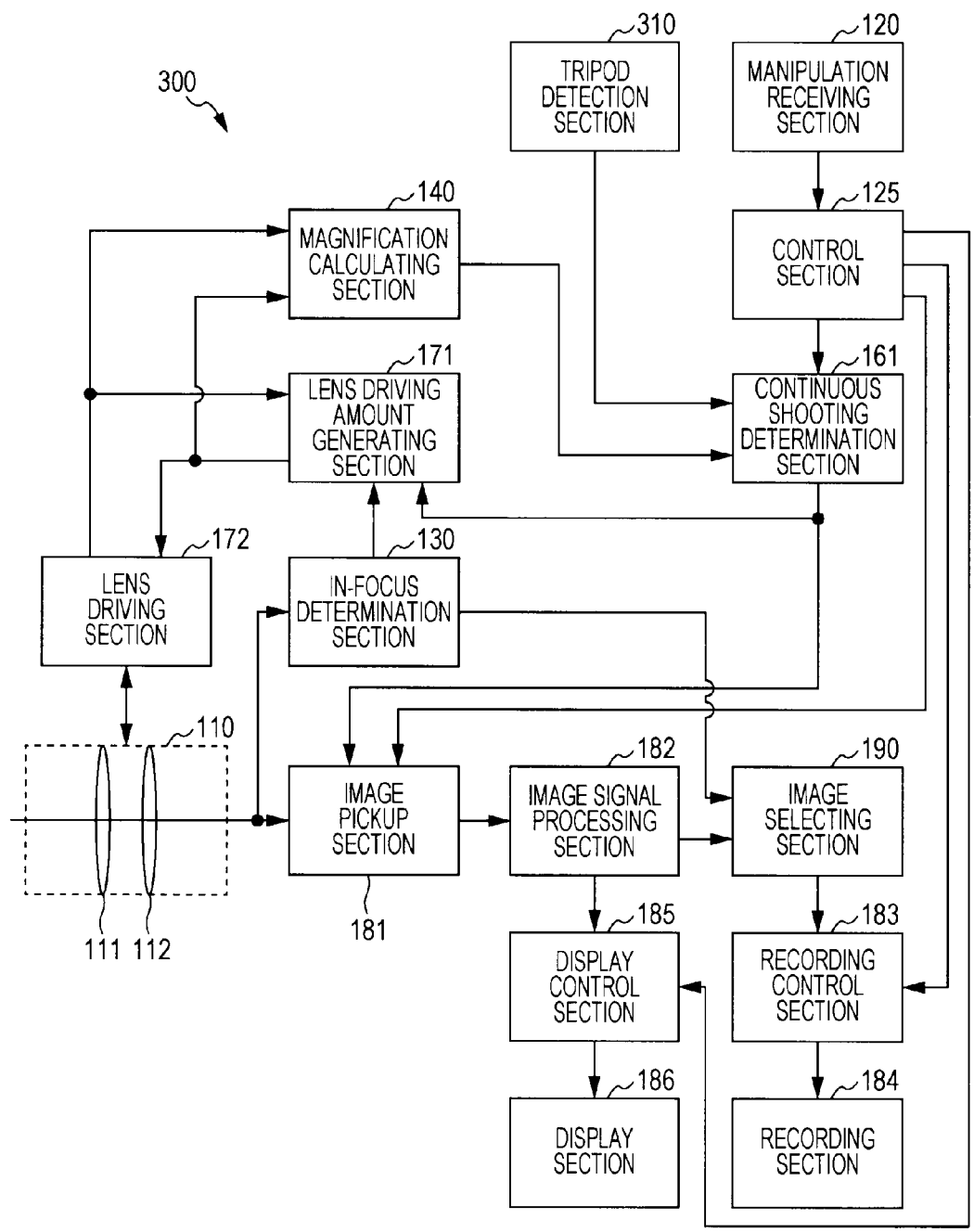
FIG. 10 is a block diagram of an exemplary functional configuration of an image pickup apparatus according to a second embodiment of the present invention.

FIG. 10 is a block diagram of an exemplary functional configuration of an image pickup apparatus 300 according to a second embodiment of the present invention.

The image pickup apparatus 300 includes a continuous shooting determination section 161 in place of the continuous shooting determination section 160 of the image pickup apparatus 100 illustrated in FIG. 1. The image pickup apparatus 300 also includes a tripod detection section 310. With reference to FIG. 10, the continuous shooting determination section 161 and the tripod detection section 310 will be described mainly.

The tripod detection section 310 detects whether the image pickup apparatus 300 is fixed. For example, the tripod detection section 310 detects whether the image pickup apparatus 300 is fixed by, for example, a tripod in accordance with time transition in angular velocity generated by a gyro sensor. The tripod detection section 310 supplies information representing whether the image pickup apparatus 300 is fixed by a tripod (i.e., apparatus fixation information) to the continuous shooting determination section 161. The tripod detection section 310 is an example of a determination section described in the claim.

The continuous shooting determination section 161 determines whether a plurality of images are to be picked up continuously (i.e., in continuous shooting) as in the continuous shooting determination section 160 illustrated in FIG. 1. When continuous shooting determination start information is supplied from a control section 125, the continuous shooting determination section 161 determines whether continuous shooting is performed in accordance with magnification information supplied from a magnification calculating section 140 and the apparatus fixation information supplied from the tripod detection section 310. For example, the continuous shooting determination section 161 determines to perform the continuous shooting when the magnification specified by the magnification information is above a threshold and the apparatus fixation information indicates that the apparatus is fixed by a tripod. The continuous shooting determination section 161 determines to perform single shooting when the apparatus fixation information does not indicate that the apparatus is fixed by a tripod even if the magnification specified by the magnification information is above a threshold. The continuous shooting determination section 161 determines to perform single shooting when the magnification specified by the magnification information is not above a threshold. The continuous shooting determination section 161 supplies the continuous shooting determination information representing the determination result to a lens driving amount generating section 171 and an image pickup section 181. The determination in continuous shooting determination section 161 will be described with reference to FIGS. 11A to 12B.

The tripod detection section 310 detects the fixed state in accordance with time transition in angular velocity generated by a gyro sensor; but the present invention is not limited to the same. For example, the tripod may be detected by a switch disposed in the image pickup apparatus at a place where the tripod is connected thereto.

Exemplary Image Pickup by Continuous Shooting

Figure 11A:
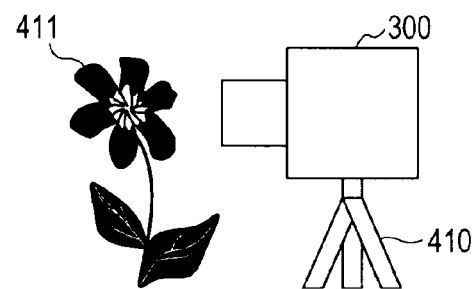
FIGS. 11A and 11B are conceptual diagrams of exemplary photographic images in the case that a continuous shooting determination section according to the second embodiment of the present invention determined to pick up the images in continuous shooting.
Figure 11B:
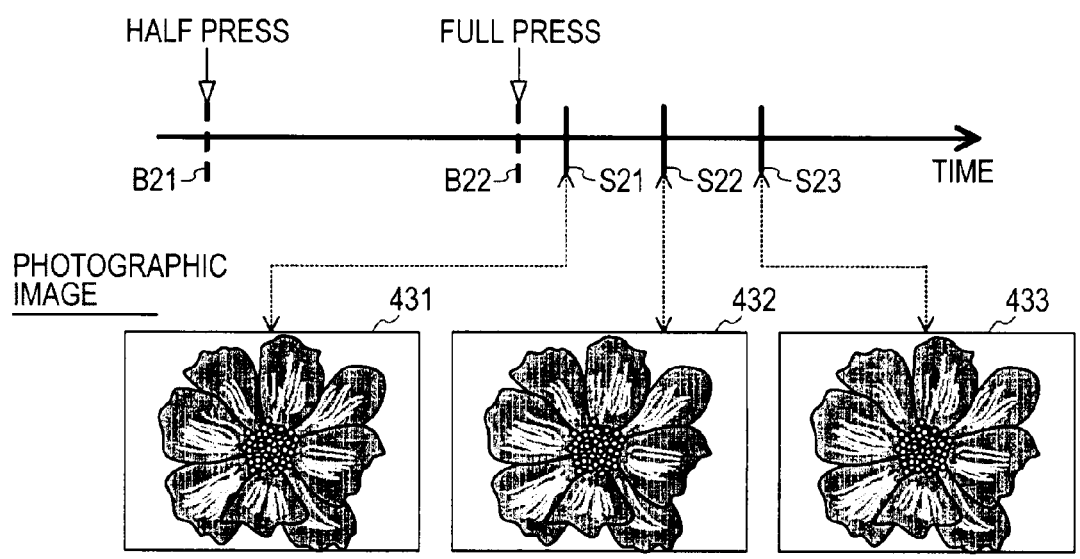

FIGS. 11A and 11B are conceptual diagrams of exemplary photographic images in the case that the continuous shooting determination section 161 according to the second embodiment of the present invention determined to pick up the images in continuous shooting.

The image pickup apparatus 300, a tripod (a tripod 410) which fixes the image pickup apparatus 300, and a flower (a flower 411) which is a target object (a target object) are illustrated in FIG. 11A. FIG. 11A illustrates a situation in which an image of the flower 411 is picked up in close-up photography (macro photography) with the image pickup apparatus 300 fixed by the tripod 410. When the close-up photography as illustrated in FIG. 11A is performed, the continuous shooting determination section 161 determines to perform the continuous shooting in accordance with the magnification being above a threshold and the image pickup apparatus 300 being fixed.

FIG. 11B illustrates image pickup timing and photographic images picked up in continuous shooting. Since FIG. 11B is substantially the same as FIG. 3 except for the determination of continuous shooting by the continuous shooting determination section 161, description thereof will be omitted.

Here, determination about continuous shooting by the continuous shooting determination section 161 will be described. When a shutter release button is half pressed (at half press timing B21), the magnification calculating section 140 calculates magnification and the tripod detection section 310 detects the existence of a tripod. The tripod detection section 310 detects that the image pickup apparatus 300 is fixed (i.e., a tripod is attached to the image pickup apparatus 300) in accordance with time transition in angular velocity, and supplies the apparatus fixation information representing the fixed state to the continuous shooting determination section 161.

The continuous shooting determination section 161 then determines to perform continuous shooting in accordance with the magnification and the apparatus fixation information. Subsequently, when the shutter release button is full pressed (at full press timing B22), the focus is locked at the in-focus position at the full press timing three images (photographic images 431, 432 and 433) are produced in continuous shooting together with defocused amounts.

As described above, the image pickup apparatus 300 produces a plurality of photographic images in automatic continuous shooting with locked focus in a situation in which the magnification is above a threshold and the image pickup apparatus 300 is fixed.

Exemplary Image Pickup in Single Shooting

Figure 12A:
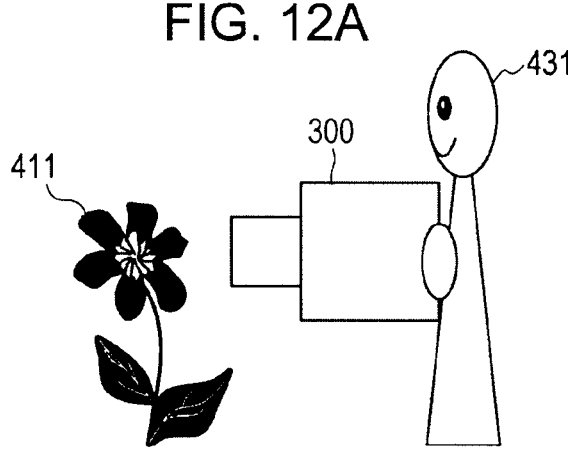
FIGS. 12A and 12B are conceptual diagrams of exemplary photographic images in the case that the continuous shooting determination section according to the second embodiment of the present invention determined to pick up the image in single shooting.
Figure 12B:
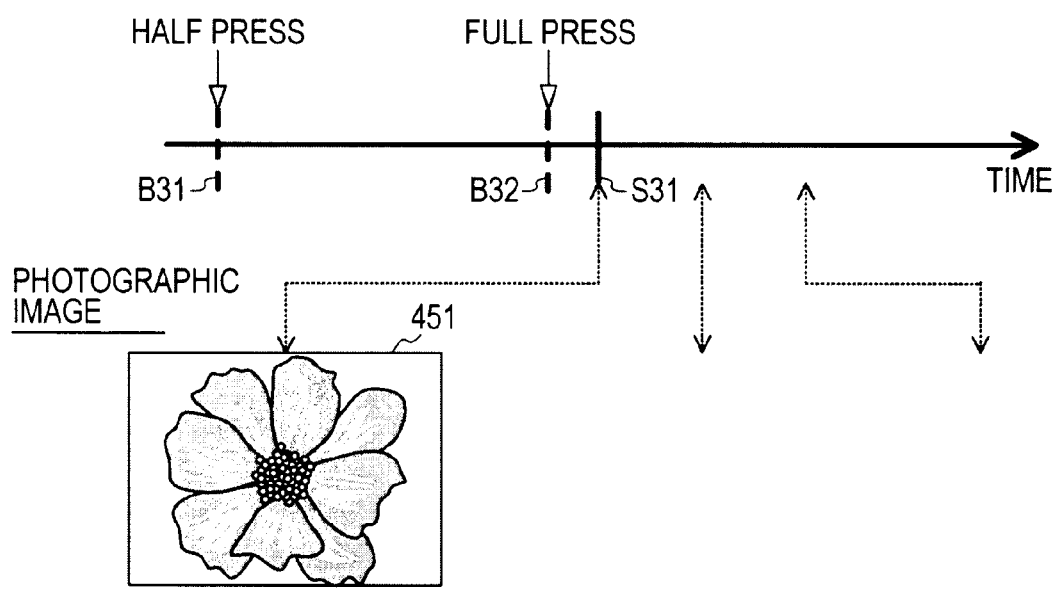

FIGS. 12A and 12B are conceptual diagrams of exemplary photographic images in the case that the continuous shooting determination section 161 according to the second embodiment of the present invention determined to pick up the image in single shooting.

The image pickup apparatus 300, a user (user 431) who holds the image pickup apparatus 300 with both hands, and a flower (flower 411) which is a target object are illustrated in FIG. 12A. FIG. 12A illustrates a situation in which the user 431 supports the image pickup apparatus 300 with both hands and picks up an image of the flower 411 in close-up photography. When the close-up photography as illustrated in FIG. 12A is performed, the continuous shooting determination section 161 determines to perform the single shooting in accordance with the magnification being above a threshold and the image pickup apparatus 300 being not fixed (i.e., a camera shake being detected from the angular velocity).

FIG. 12B schematically illustrates image pickup timing in single shooting and a photographic image picked up at shutter timing S31. Since FIG. 12B is substantially the same as FIG. 4 except for the determination of continuous shooting by the continuous shooting determination section 161, description thereof will be omitted.

The determination about single shooting by the continuous shooting determination section 161 will be briefly explained in comparison with the determination about continuous shooting described with reference to FIGS. 11A and 11B. In a period between the half press timing B31 and the full press timing B32, the continuous shooting determination section 161 analyzes that the image pickup apparatus 300 is not fixed while the magnification is above a threshold. The continuous shooting determination section 161 supplies the continuous shooting determination information representing single shooting to the lens driving amount generating section 171 and the image pickup section 181. Then the shutter release button is full pressed (full press timing B32) and a single image (the photographic image 451) is produced in single shooting.

As described above, the image pickup apparatus 300 performs single shooting to produce a single photographic image when the image pickup apparatus is not fixed while the magnification is above a threshold.

Exemplary Operation of Image Pickup Device

Next, an operation of the image pickup apparatus 300 according to the second embodiment of the present invention will be described with reference to the drawings.

Figure 13:
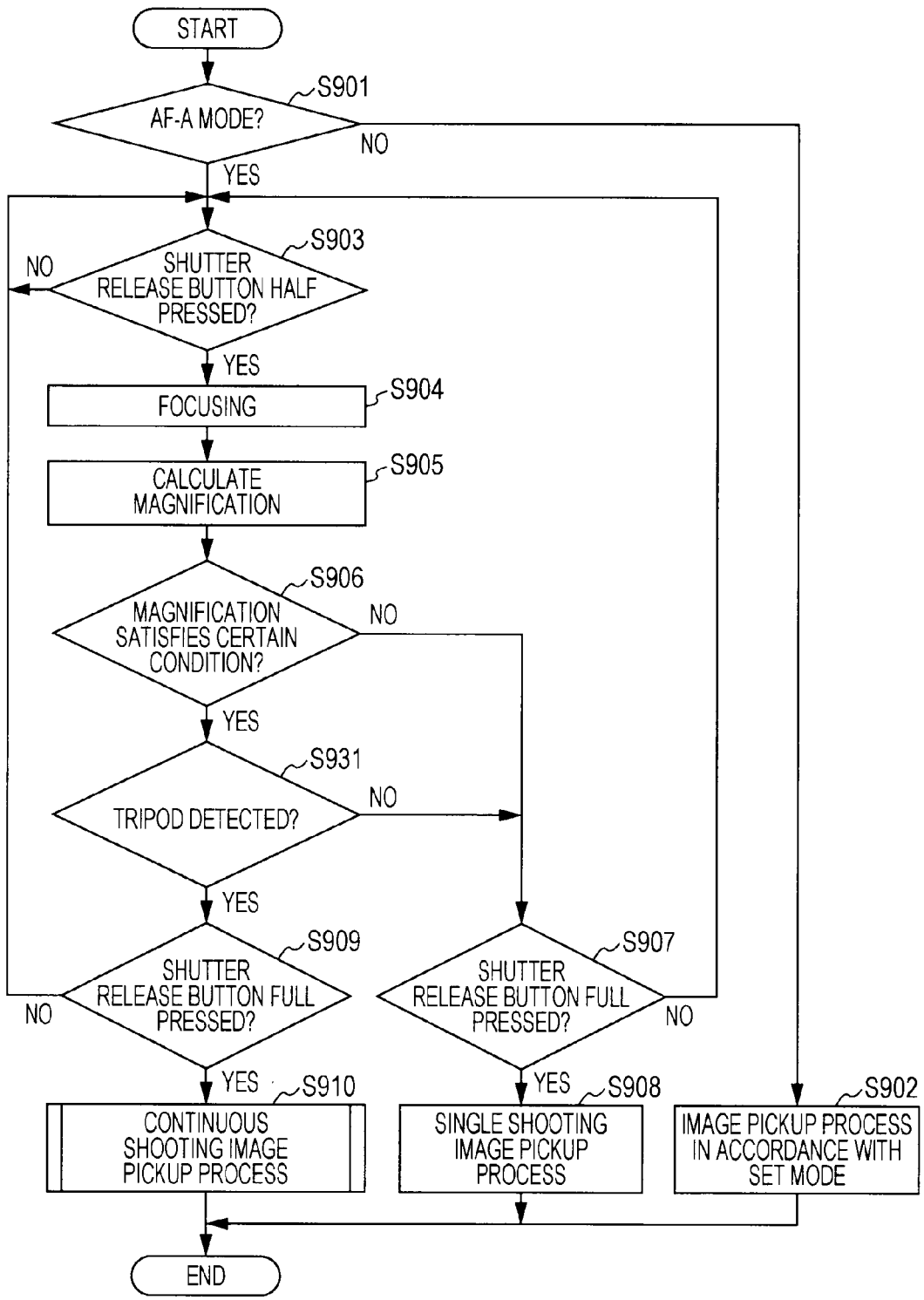
FIG. 13 is a flowchart of an exemplary procedure for an image pickup process by an image pickup apparatus according to the second embodiment of the present invention.

FIG. 13 is a flowchart of an exemplary procedure for an image pickup process by the image pickup apparatus 300 according to the second embodiment of the present invention. This procedure is a modified example of FIG. 8, and a difference therebetween is that the image pickup process is switched in accordance with whether the image pickup apparatus is fixed by a tripod. Since other features are the same as those illustrated in FIG. 8, the features are denoted by the same reference numerals and description thereof will be omitted if necessary.

First, it is determined that the magnification satisfies a certain condition (i.e., is above a threshold) (step S906). The continuous shooting determination section 161 then determines whether the image pickup apparatus is fixed in accordance with the apparatus fixation information (step S931). If it is determined that the image pickup apparatus is not fixed (step S931), the process proceeds to step S907.

If, on the contrary, it is determined that the image pickup apparatus is fixed (step S931), the process proceeds to step S909.

As described above, according to the second embodiment of the present invention, whether or not the images of the subject are to be picked up in continuous shooting can be determined automatically depending on the magnification and the fixed state of the image pickup apparatus. This can reduce influences on the user caused by the continuous shooting (for example, the user moves the camera in surprise).

3. Third Embodiment

In the second embodiment of the present invention, an example in which determines automatic whether images of a subject will be picked up in continuous shooting is determined in accordance with whether the image pickup apparatus is fixed by a tripod and in accordance with the magnification has been described. In the examples of the first and second embodiments, when the continuous shooting is performed with the low shutter release speed (i.e., with longer exposure time), several blurred photographic images will be produced due to blurring of the subject. As a result, images of the subject are picked up repeatedly in vain.

In a third embodiment of the present invention, an example of an image pickup apparatus capable of setting continuous shooting in accordance with shutter release speed (exposure time) will be described with reference to FIGS. 14 and 15.

Exemplary Functional Configuration of Image Pickup Apparatus

Figure 14:
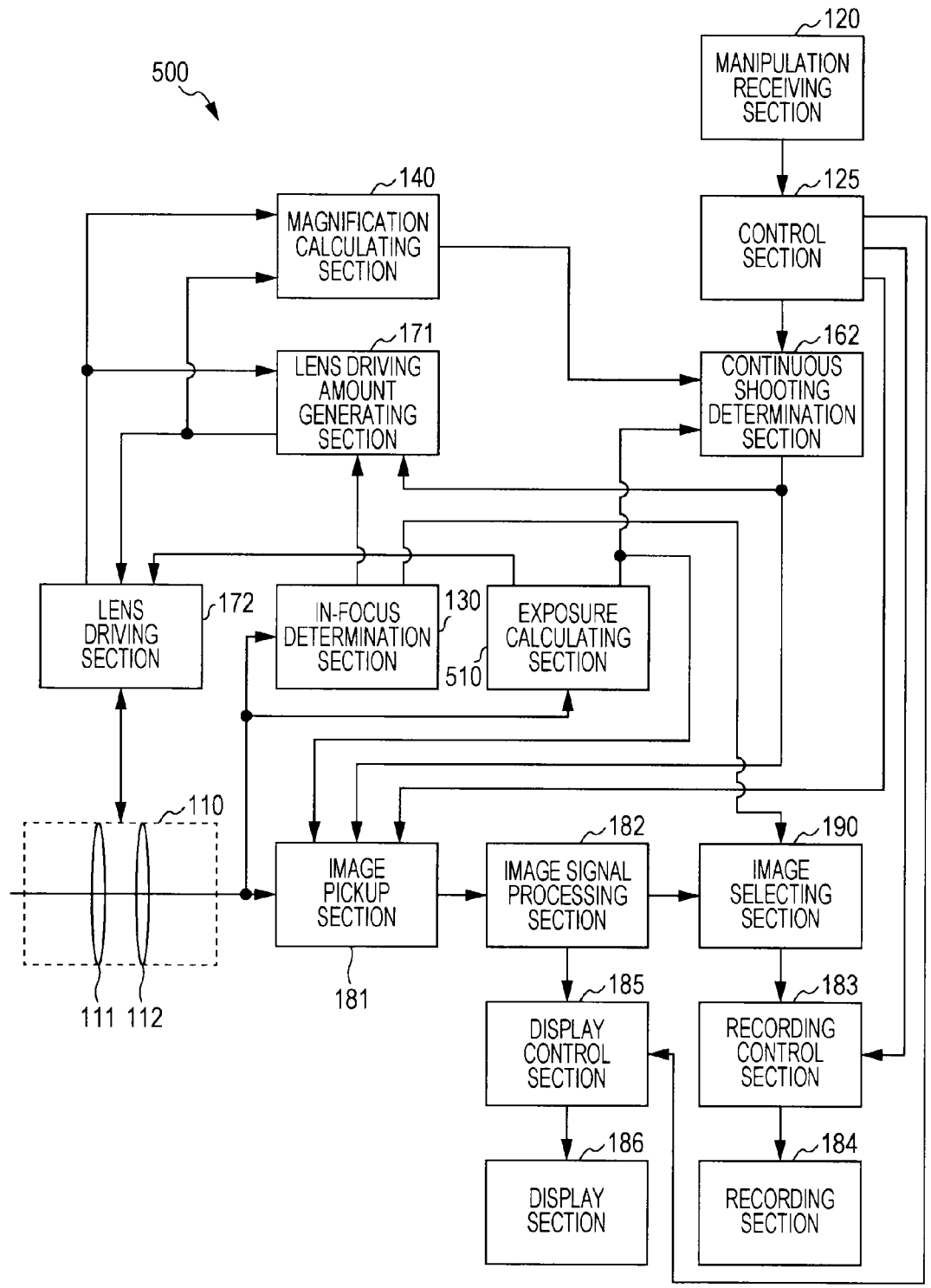
FIG. 14 is a block diagram of an exemplary functional configuration of an image pickup apparatus according to a third embodiment of the present invention.

FIG. 14 is a block diagram of an exemplary functional configuration of an image pickup apparatus 500 according to a third embodiment of the present invention.

The image pickup apparatus 500 includes a continuous shooting determination section 162 in place of the continuous shooting determination section 160 of the image pickup apparatus 100 illustrated in FIG. 1. The image pickup apparatus 500 also includes an exposure calculating section 510. With reference to FIG. 14, the continuous shooting determination section 162 and the exposure calculating section 510 will be described mainly.

In FIG. 14, it is assumed that a lens driving section 172 controls the aperture in accordance with information about an f number supplied from the exposure calculating section 510. It is also assumed that an image pickup section 181 controls the shutter release speed in accordance with information about the shutter release speed supplied from the exposure calculating section 510.

The exposure calculating section 510 calculates the shutter release speed and the f number in accordance with the incident light from the subject and in accordance with setting of sensitivity of the image pickup device. The exposure calculating section 510 supplies information about the calculated f number to the lens driving section 172. The exposure calculating section 510 also supplies information about the calculated shutter release speed (shutter release speed information) to the continuous shooting determination section 162 and the image pickup section 181.

The continuous shooting determination section 162 determines whether a plurality of images are to be picked up in continuous shooting as in the continuous shooting determination section 160 illustrated in FIG. 1. When continuous shooting determination start information is supplied from a control section 125, this continuous shooting determination section 162 determines whether continuous shooting is performed in accordance with magnification information supplied from a magnification calculating section 140 and the shutter release speed information supplied from the exposure calculating section 510. For example, the continuous shooting determination section 162 determines to perform continuous shooting when the magnification specified by the magnification information is above a magnification threshold and when the shutter release speed indicated by the shutter release speed information is not above a shutter release speed threshold (i.e., the shutter release speed is high). The continuous shooting determination section 162 determines to perform single shooting when the magnification is above the threshold and the shutter release speed is also above the threshold (i.e., the shutter release speed is low). The continuous shooting determination section 162 determines to perform single shooting when the magnification is not above the threshold. The continuous shooting determination section 162 supplies the continuous shooting determination information representing the determination result to a lens driving amount generating section 171 and an image pickup section 181.

Exemplary Operation of Image Pickup Device

Next, an operation of the image pickup apparatus 500 according to the third embodiment of the present invention will be described with reference to the drawings.

FIG. 15 is a flowchart of an exemplary procedure for an image pickup process by the image pickup apparatus 500 according to the third embodiment of the present invention. This procedure is a modified example of FIG. 8, and a difference therebetween is that the image pickup process is switched in accordance with whether the shutter release speed is above a threshold. Since other features are the same as those illustrated in FIG. 8, the features are denoted by the same reference numerals and description thereof will be omitted if necessary.

After it is determined that the magnification satisfies a certain condition (i.e., is above a threshold) (step S906), the continuous shooting determination section 162 determines whether the shutter release speed satisfies a certain condition (i.e., is not above a threshold) (step S941). If it is determined that the shutter release speed does not satisfy the certain condition (i.e., is above the threshold) (step S941), the process proceeds to step S907.

If, on the contrary, it is determined that the shutter release speed satisfies the certain condition (i.e., is below the threshold) (step S941), the process proceeds to step S909.

As described above, according to the third embodiment of the present invention, whether or not the images of the subject are to be picked up in continuous shooting can be determined automatically depending on the magnification and the shutter release speed. This allows image pickup of the subject in single shooting when, for example, the shooting is performed at shutter release speed low enough to cause camera shake (in this case, for example, a camera shake warning icon is displayed on a display section 186).

As described above, in the embodiment of the present invention, well-focused images can be selected through phase difference detection.

The embodiments of the present invention have been provided to illustrate examples of the implementation of the present invention. As has been explicitly stated in the embodiments of the present invention, the matters in the embodiments of the present invention and the matters to define the present invention described in the claims correspond to each other. Similarly, the matter to define the present invention described in the claims and the matters in the embodiments of the present invention denoted by the same names correspond to each other. However, the present invention is not limited to these embodiments; the present invention can be implemented through various modifications made to the embodiments without departing from the scope and spirit of the present invention.

The procedure described in the embodiments of the present invention may be considered as: a method which includes a series of the procedure; a program which causes a computer to execute a series of procedure; or a recording medium which stores the program. Examples of the recording medium include a compact disc (CD), a MiniDisc (MD), a Digital Versatile Disk (DVD), a memory card and a Blu-ray Disc (registered trademark).

The present application contains subject matter related to that disclosed in Japanese Priority Patent Application JP 2010-123732 filed in the Japan Patent Office on May, 31, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing unit comprising:
   an input section which inputs a plurality of images each of which is associated with a difference from an in-focus state detected in accordance with differences among images of a subject which is divided during production of each of the plurality of images, the images being produced in continuous shooting in which a series of images are produced continuously in time series; and
   a selecting section which selects an image with the smallest difference from an in-focus state from among the plurality of images; and
   an image pickup section which picks up an image of the subject and produces a photographic image;
   a magnification calculating section which calculates magnification in accordance with a focal length and a subject distance; and
   a setting section which sets a continuous shooting mode in which the continuous shooting is performed as a shooting mode if the calculated magnification satisfies a certain condition.

2. The image processing unit according to claim 1, further comprising a difference calculating section which calculates the difference from the in-focus state by focus detection through phase difference detection.

3. The image processing unit according to claim 1, wherein the setting section sets the continuous shooting mode under the certain condition that the calculated magnification is larger than a predetermined magnification.

4. The image processing unit according to claim 1, further comprising a determination section which determines whether or not the image processing unit is fixed, wherein the setting section sets the continuous shooting mode only when the magnification satisfies the certain condition and it is determined that the image processing unit is fixed.

5. The image processing unit according to claim 1, wherein the setting section sets the continuous shooting mode only when the magnification satisfies the certain condition and a shutter release speed during shooting of the plurality of images is higher than a predetermined speed.

6. The image processing unit according to claim 2, further comprising:
   an image pickup section which picks up an image of the subject and produces a photographic image;
   a focus control section which controls focus in accordance with the difference from the in-focus state; and
   a control section which, if a plurality of images are produced in continuous shooting, stops the focus control during a period from the start to the end of the shooting of the plurality of images.

7. An image pickup apparatus comprising:
   an image pickup section which picks up an image of a subject and produces a photographic image;
   a magnification calculating section which calculates magnification in accordance with a focal length and a subject distance; and
   a setting section which sets a continuous shooting mode in which a plurality of images are produced in continuous shooting in which a series of images are produced continuously in time series as a shooting mode if the calculated magnification satisfies a certain condition.

8. An image processing method comprising the steps of:
   inputting with processing circuitry, a plurality of images each of which is associated with a difference from an in-focus state detected in accordance with differences among images of a subject which is divided during production of each of the plurality of images, the images being produced in continuous shooting in which a series of images are produced continuously in time series; and
   selecting with processing circuitry, an image with the highest focusing degree from among the plurality of images in accordance with a difference from an in-focus state; and
   calculating a magnification in accordance with a focal length and a subject distance in at least one of the input images; and
   setting a continuous shooting mode in which the continuous shooting is performed as a shooting mode if the calculated magnification satisfies a certain condition.

9. A non-transitory computer readable medium storing a program which causes a computer to execute a procedure comprising:
   inputting a plurality of images each of which is associated with a difference from an in-focus state detected in accordance with differences among images of a subject which is divided during production of each of the plurality of images, the images being produced in continuous shooting in which a series of images are produced continuously in time series; and
   selecting an image with the highest focusing degree from among the plurality of images in accordance with a difference from an in-focus state; and
   calculating a magnification in accordance with a focal length and a subject distance in at least one of the input images; and
   a setting section which sets a continuous shooting mode in which the continuous shooting is performed as a shooting mode if the calculated magnification satisfies a certain condition.

* * * * *